Aug. 17, 1948.     C. L. DEY     2,447,399
DIGGING AND SORTING MACHINE
Filed March 9, 1944     2 Sheets-Sheet 1
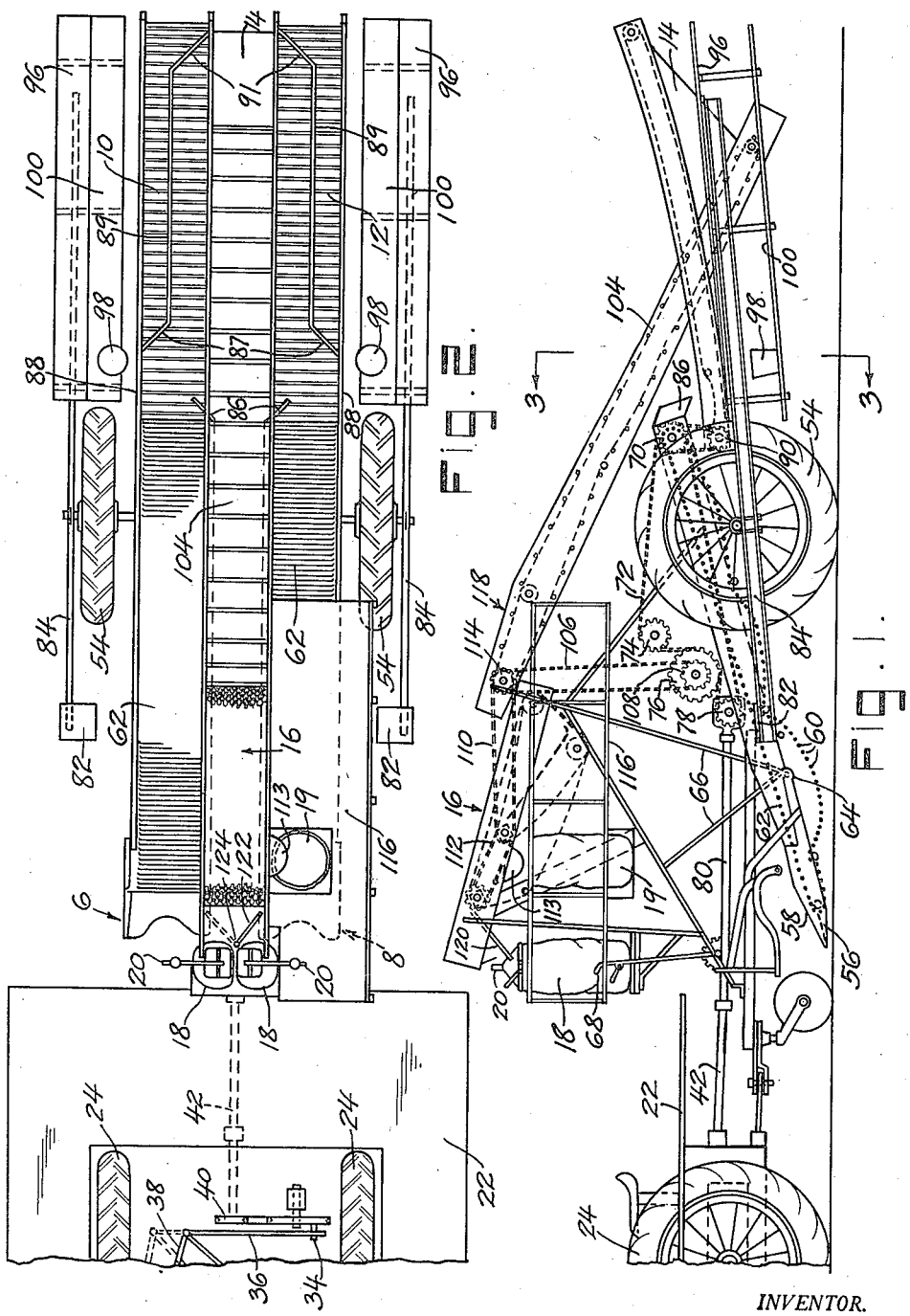
INVENTOR.
CHARLES LAWRENCE DEY
BY
*Albert Sperry.*
ATTORNEY Aug. 17, 1948.　　　C. L. DEY　　　2,447,399
DIGGING AND SORTING MACHINE
Filed March 9, 1944　　　2 Sheets-Sheet 2

INVENTOR.
CHARLES LAWRENCE DEY
BY Albert Sperry.
ATTORNEY

Patented Aug. 17, 1948

2,447,399

UNITED STATES PATENT OFFICE 2,447,399

DIGGING AND SORTING MACHINE

Charles Lawrence Dey, Princeton Junction, N. J.

Application March 9, 1944, Serial No. 525,765

6 Claims. (Cl. 55—51)

My invention relates to machines for digging, sorting and sacking potatoes, onions, beets and other root vegetables in the field, and particularly to machines which are relatively simple and inexpensive to construct, easy to operate and manipulate and which render it possible to eliminate all weeds, vines, stones and imperfect vegetables from the sacked product.

It has been usual heretofore, when digging potatoes on a large scale, to use a potato digger which plows up the potatoes and drops them on the top of the ground along the row behind the digger. The potatoes are then picked up by hand and carted to a barn or shed where they are sorted for size and sacked by another machine. These operations permit adequate inspection of the vegetable since only the good vegetables are picked up and all stones and vines are left on the ground. However, such operations require a great deal of labor and carting of the potatoes and there is always the danger that the potatoes will be scalded by the sun before they are picked up, and many good potatoes may be overlooked and left behind by careless pickers.

Various machines for digging, sorting and sacking potatoes in a continuous operation have been designed and suggested heretofore, but so far as I am aware, no machine of this character has ever proven practical in operation. One of the principal objections to the prior art constructions arises from the fact that they do not provide for sufficient inspection of the vegetables and as a result many vines, stones and weeds are sacked along with the potatoes. Furthermore, such machines generally have been complicated and expensive in construction and have been so difficult to manipulate that they require an excessive amount of space to turn around at the end of the rows.

In accordance with my invention these objections and difficulties are overcome and a machine provided which has demonstrated its utility and advantages in digging hundreds of acres of potatoes. These advantages may be attained in various ways and by means of numerous alternative constructions. However, in general the invention embodies a digger and sorting machine, including means for eliminating vines and weeds, together with elements arranged to provide for repeated and careful inspection to remove all stones and imperfect vegetables as well as any remaining vines so that the sacked product is just as clean and carefully sorted as if all operations had been done by hand. Moreover, the machine is so designed that it is well balanced and substantially symmetrical and the elements are so arranged that the machine may be manipulated easily and turned at the ends of the rows without difficulty or requiring excessive space. Furthermore, the operation of the machine is sufficiently smooth and steady to render it possible to weigh the sacks on the machine and therefore the sacked vegetables may be taken directly from the machine to shipping or storage points. Another feature of my invention resides in the provision of means whereby stones dug up with the potatoes may be removed and collected so that the field may incidentally be cleared of stones during the operation of digging the potatoes.

One of the objects of my invention is to provide a novel type of digging and sorting machine which is characterized by the provision for adequate inspection and sorting of the vegetables dug.

Another object of my invention is to provide a potato digger and sorter which is sufficiently balanced and symmetrical to be easy to manipulate and operate.

A further object of the invention is to provide a potato digger and sorter with means to eliminate weeds and vines and provide for the removal and collection of stones which may be dug up with the potatoes.

These and other objects and features of my invention will appear from the following description thereof in which reference is made to the figures of the accompanying drawing.

In the drawing:

Fig. 1 is a side elevation of a typical potato digger and sorter embodying my invention.

Fig. 2 is a top plan view of the construction shown in Fig. 1.

Figure 5:
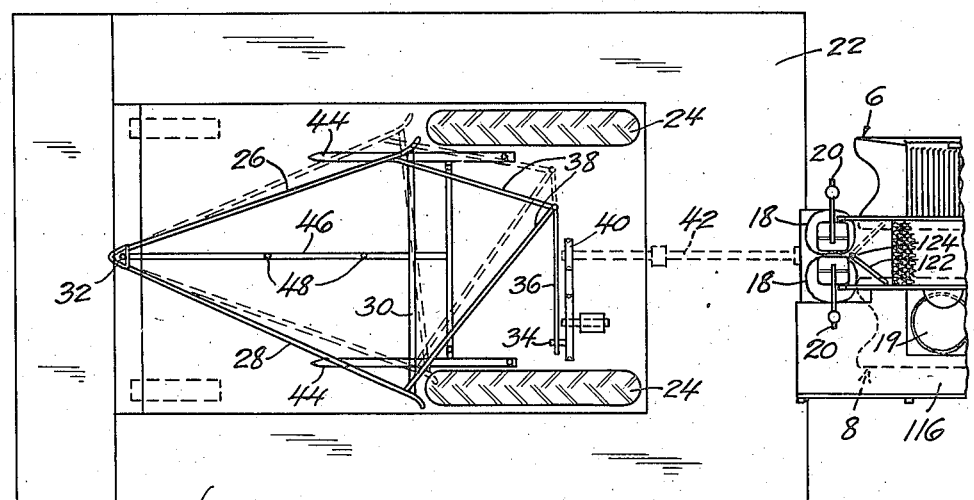
Fig. 5 is a diagrammatic top plan view of the construction shown in Fig. 4.
Figure 4:
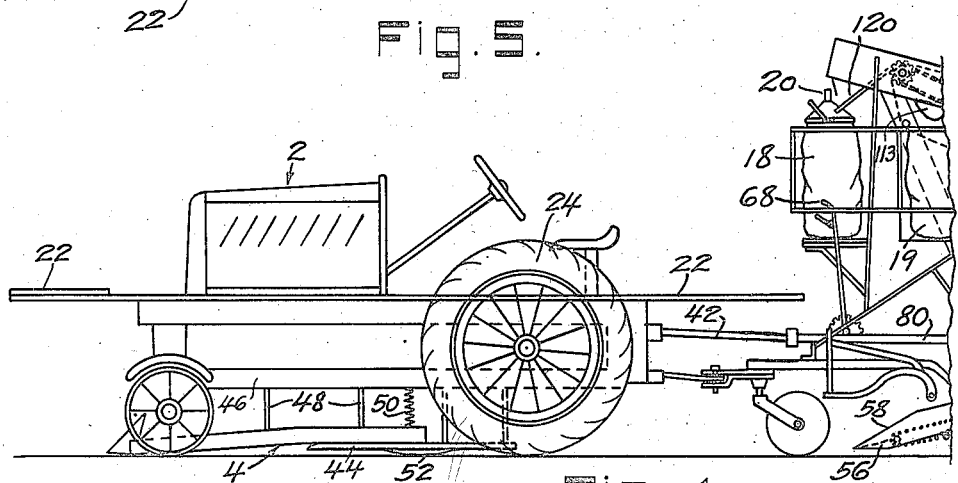
Fig. 4 is a side elevation of a tractor and vine removing means used in combination with the construction of Figs. 1, 2 and 3.

In that form of my invention illustrated in the figures of the drawing there is a tractor 2 which carries elements indicated generally at 4 for cutting vines and weeds along the rows of potatoes in advance of the diggers. The machine is designed to dig and sort two rows of potatoes at a time and for this purpose two diggers 6 and 8 are provided which serve to pass the potatoes to the inspection or picking tables 10 and 12 from which the sorted potatoes are transferred to a centrally located hopper 14. The cleaned and inspected potatoes are carried from the hopper 14 to the sorter 16 where the No. 1 size and No. 2 size potatoes are separated and discharged into sacks 18 and 19. These sacks are weighed on the scale 20 and after being sewn up are stacked on the platform 22 which surrounds the tractor so that the sacked potatoes may be transferred directly from the machine to a truck at the end of each row or at other suitable points.

The vine cutting elements 4 are located in advance of the traction wheels 24 of the tractor 2 and as shown include the movable shear blades 26 and 28 which are connected together near the rear ends thereof by a cross bar 30 and are connected near the front end of the tractor chassis to a vertically extending pivot member 32.

The blades are reciprocated horizontally about the pivot member 32 by the crank 34 and pitman 36 which is connected to arms 38 secured to the blades 26 and 28. The crank 34 in turn is driven by a belt from the pulley 40 on the power take-off shaft 42 of the tractor.

The movable blades 26 and 28 cooperate with stationary blades 44 which are supported by the central bar 46 and the supporting rods 48. Springs 50 urge the cutter blades downward so that the skid 52 on the stationary blade will engage the surface of the ground and insure cutting of the weeds and vines close to the top of the ground. In practice the cutting elements are all mounted on the cultivator frame of the tractor and are raised and lowered as a unit by the usual levers (not shown) which are provided for this purpose.

The movable blades are so arranged that they also serve to deflect the cut weeds and vines outward from the row of vegetables so that they are in the path of the traction wheels of the tractor and are crushed into the soil and at least partially buried and do not extend into the path of the potato diggers 6 and 8.

The digger elements of the machine may embody the essential parts of any convenional potato digger of the prior art. The elements actually used in practice include the apron links of a well known digger together with a shovel for digging up the potatoes and passing them to the apron. As shown in Figs. 1 and 2, the diggers are arranged on each side of the machine between the wheels 54 which support the digging and sorting mechanism and in position to dig two rows of potatoes at a time. These diggers are provided with shovels 56 formed with extended sides which are curved upward at 58 to prevent the potatoes from rolling out sideways from the dirt raised by the shovels. In this way all potatoes are directed to the links 60 of the aprons 62. However, any preferred form of shovels and aprons may be substituted for those illustrated. The shovels are hingedly connected at 64 to the frame members 66 and are adapted to be raised and lowered in the usual manner by the lever 68 so as to vary the depth to which the shovels extend in digging the potatoes.

The upper runs of the link aprons 62 pass about the sprocket 70 driven by the chain 72. The latter chain passes over the idler 74 and beneath the sprocket 76 to the sprocket 78 driven by the shaft 80 connected to the usual power take-off shaft 42 of the tractor 2.

With this construction the potatoes are carried from the shovels toward the rear of the machine while the dirt is allowed to fall through the links of the apron in the usual manner. In so moving the potatoes move upward past a seat 82 carried by each channel iron 84 on the outside of the wheels 54. Operators on these seats may remove from the potatoes on the digger apron any remaining vines and weeds but they may also remove all stones that may be carried by the apron if desired.

The upper ends of the link aprons 62 extend beyond the lower end of spaced inspection or picking tables 10 and 12 which are somewhat narrower than the link aprons 62 and spaced apart to provide the central hopper 14 into which the potatoes from both rows and from both inspection tables may be directed. Deflectors 86 serve to direct the potatoes from the relatively wide digger apron onto the narrower inspection tables whereas guards 88 extend along the outer edge of the inspection tables to prevent potatoes from falling off the outer sides of the inspection tables.

The inspection tables are preferably in the form of belts or aprons having links similar to the links in the digger aprons 62. However, any other suitable form of belt may be used. The inspection table aprons are driven by sprocket 90 which may be provided with a slip clutch and driven by a chain from sprocket 70 so as to carry the potatoes past operators on the seats 96 mounted on the channelled beams 84. The upper run of the inspection belt when thus driven will sag sufficiently to prevent the potatoes from rolling off the lower end of the belt. However, if desired a guard may extend across the lower end of the inspection belt to prevent spilling of the potatoes therefrom.

The operators who inspect the potatoes on the tables 10 and 12 sit on the seats 96 and remove any remaining vines or weeds and all stones or other foreign material which is carried by the belts.

Baskets 98 are arranged on the foot rests 100 to receive the stones whereas the operators push the potatoes across the tables into a hopper 14 between the tables.

In the preferred construction, guard 88 has a portion extending lengthwise of the inspection table and the first operator is located adjacent this portion and picks out all stones and places them in the baskets 98. The potatoes and any remaining foreign matter then pass on and are deflected toward the inner edge of the inspection table by the member 87. The next operator then removes weeds and imperfect potatoes from the inner portion of the table and lifts them over the longitudinally extending rail 89, placing them on the outer portion of the table so that they are carried on to the end of the machine where they fall to the ground. If a third inspector is used he duplicates the work of the second, whereas the inspected potatoes are directed into the hopper 14 by the deflector 91.

While the deflectors 91 may be located over the aprons of the picking tables, it is often desirable to rely on the operators to push the potatoes into the hopper and to remove the deflectors 91 so that any remaining dirt separated from the potatoes may be carried to the end of the machine and dumped back onto the ground.

Each of the tables 10 and 12 may be made long enough to accommodate two or even three inspectors so that all of the potatoes may be well cleaned and picked over and all stones, weeds, vines and imperfect potatoes removed. Moreover, the arrangement is such that both tables are readily accessible and the machine is substantially symmetrical in design giving it the balance necessary for easy manipulation thereof.

Figure 3:
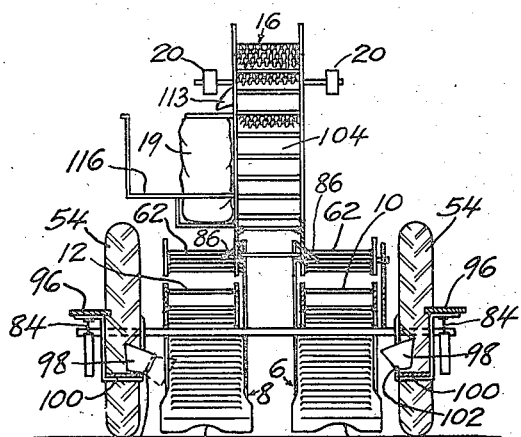
Fig. 3 is a vertical sectional view taken on the line 3—3 of Fig. 1.

Furthermore, as shown in Fig. 3, the stone-receiving baskets 98 may be secured in place by pivot means 102 so that when the machine reaches the end of the row all stones may be dumped at the same time by tilting them to the dotted line position and in this way the stones may be piled together for removal so that the field may be cleared of stones as an incident to the digging of the potatoes.

The hopper 14 which receives the cleaned and inspected potatoes is provided with a conveyor 104 by which they are carried to a receiver which is preferably the sorter 16. Any preferred type of sorter may be used but both the conveyor and the sorter are arranged so as to lie in a vertical plane centrally of the machine insuring proper balance thereof. The conveyor 104 which carries the potatoes from the common hopper 14 to the sorter is driven by the chain 106 from the sprocket 108, mounted on the same shaft as the sprocket 76 and provided with a slip clutch, and is driven fast enough to remove the potatoes received from both sorting belts so that the hopper will never fill up with potatoes.

The sorting device 16 may be of any preferred type and I have used elements of an ordinary sorter in actual practice. These elements are driven by the chains 110 and 112 from the upper sprocket 114 which drives the conveyor 104. The sorter serves to separate the No. 1 size potatoes from the No. 2 size potatoes, and although the No. 3 size potatoes generally fall through the links of the digger aprons 62, the smaller potatoes may also be collected if desired.

The machine is provided with a platform 116 on which an operator works in applying and removing the sacks 19 to which No. 2 potatoes are discharged from the sorter by chute 113. However, the greater part of his time is available for making final inspection of the potatoes as they pass to the sorter along the upper horizontal portion 118 of conveyor 104 which thus serves as an inspection table.

The No. 1 size potatoes, which constitute the bulk of the crop, are discharged from the grader to a chute 120 which has a deflector 122 pivotally mounted thereon at 124. Two scales 20 are located below and on opposite sides of the chute and sacks 18 are attached to each scale. The deflector serves to direct the potatoes to one sack and through the other so that one sack may be filling while the other is being weighed and removed and a new sack placed on the scale. The operators for this purpose stand on the rear of the platform 22 on the tractor and in front of the sorter.

With this construction, the operations of digging, inspecting, sorting and sacking can be carried on continuously and five operators and a tractor driver can dig potatoes at the rate of two-thirds acre or approximately 100 sacks of potatoes per hour. Ordinarily, however, I use from eight to twelve operators and a tractor driver, one operator being located on each of the seats 82 to remove vines from the potatoes on the digger aprons, two or three operators are then placed at each inspection table and one operator stands on the platform 116 to perform the final inspection while two or three operators stand on the platform 22 to weigh and handle the sacked potatoes, sew up the sacks and arrange them about the platform near the front of the tractor. The speed of operation and the number of operators employed of course varies to some extent with the size of the crop, the type of soil and the amount of stones, weeds and vines which must be removed during operation. In any event the machine effects a great saving in labor and operating expense and insures the handling of the potatoes without danger of sun scald or the losses incident to careless picking of the potatoes. At the same time the machine presents the inspection tables in an arrangement which renders it possible to use any number of operators necessary to insure a clean, marketable product of the highest value.

The machine described is not only capable of digging two rows of potatoes at a time but it is symmetrical with respect to its longitudinal axis and therefore is suitably balanced for operation on rough or hilly ground. Moreover, the weight of the machine and operators is so distributed that effective traction is assured, particularly when the platform 22 is well loaded and the necessity for traction is greatest. Furthermore, the driving connections by which the various elements of the machines are operated and coordinated, are simple in construction and are removed from those areas where dirt, stones, vines or other foreign matter might fall onto the chains or otherwise interfere with the operation thereof.

Although I have illustrated and described my invention in its preferred form as embodying parallel diggers for digging and sorting two rows of potatoes at a time, the invention is equally applicable to constructions in which a single row of potatoes is dug. In such constructions it is possible to omit one of the diggers and to inspect the potatoes on either one or a pair of picking tables as described above. Such one-row digger and sorting machines are capable of operation at higher speed than the two-row digger, and therefore, in some instances, may be preferred.

While I have illustrated and described a type of machine which I have found to be practical and economical in operation it will be apparent that many changes in construction, arrangement and form of elements may be made without departing from the spirit and scope of my invention. It should therefore be understood that the form of the invention shown and described is intended to be illustrative only and is not intended to limit the following claims.

I claim:

1. In a machine for digging and sorting root vegetables such as potatoes or the like wherein there are parallel diggers arranged to dig adjacent rows of vegetables, parallel inspection belts extending rearwardly from said diggers and each having one side thereof accessible for inspection of the vegetables thereon, a common hopper located between said inspection belts in position to receive vegetables from both belts, a sorter located near the front of the machine, and a conveyor movable longitudinally of the machine in a plane passing between the diggers for carrying vegetables from the hopper to the sorter.

2. In a machine for digging and sorting root vegetables such as potatoes or the like wherein there are parallel diggers arranged to dig adjacent rows of vegetables, parallel inspection belts extending rearwardly from said diggers and each having one side thereof accessible for inspection of vegetables thereon, a common hopper located between said inspection belts in position to receive vegetables from both belts, a sorter located near the center of the front of the machine, and a conveyor extending upwardly and forwardly from said hopper to the sorter.

3. In a machine for digging and sorting root vegetables such as potatoes or the like wherein there are parallel diggers arranged to dig adjacent rows of vegetables, inspection belts extending rearwardly from said diggers, a common hopper located between said inspection belts in position to receive vegetables from both belts, a sorter located near the front of the machine, and a conveyor for carrying vegetables from the hopper to the sorter, said hopper, conveyor and sorter all lying in a plane extending vertically between the diggers.

4. In a machine for digging and sorting root vegetables such as potatoes or the like wherein there is a frame supported on wheels which are spaced apart sufficiently to straddle two rows of the vegetables and two parallel diggers carried by said frame and located between said wheels, inspection belts positioned to receive vegetables from said diggers and movable to carry vegetables rearwardly of the machine past operator stations, a hopper located between said belts in position to receive vegetables removed from both belts by the operators, a receiver also carried by said frame, and a conveyor for moving the vegetables from the hopper forwardly of the machine to the receiver.

5. In a machine for digging and sorting root vegetables such as potatoes or the like wherein there is a frame supported on wheels which are spaced apart sufficiently to straddle two rows of the vegetables and two parallel diggers carried by said frame and located between said wheels, inspection belts positioned to receive vegetables from said diggers and movable to carry vegetables rearwardly of the machine past operator stations, a hopper located between said belts in position to receive vegetables removed from both belts by the operators, a sorter carried by said frame and located over said diggers, near the front of the machine, and a conveyor for moving potatoes forward from said hopper to said sorter.

6. In a machine for digging and sorting root vegetables such as potatoes or the like wherein there is a frame supported on wheels which are spaced apart sufficiently to straddle two rows of the vegetables and two parallel diggers carried by said frame and located between said wheels, inspection belts positioned to receive vegetables from said diggers and movable to carry vegetables rearwardly of the machine past operator stations, a hopper located between said belts in position to receive vegetables removed from both belts by the operators, a sorter carried by said frame and located over said diggers near the front of the machine and a conveyor for moving potatoes forward from said hopper to said sorter, said hopper, conveyor and sorter all being located in a vertical plane passing between the diggers.

CHARLES LAWRENCE DEY.

REFERENCES CITED

The following references are of record in the file of this patent:

UNITED STATES PATENTS

| Number | Name | Date |
|---|---|---|
| 965,667 | Thompson | July 26, 1910 |
| 1,440,232 | Muir | Dec. 26, 1922 |
| 1,663,257 | MacKenzie | Mar. 20, 1928 |
| 1,755,660 | Morrow | Apr. 22, 1930 |
| 1,920,701 | Jenkins | Aug. 1, 1933 |
| 1,928,185 | Morris | Sept. 26, 1933 |
| 2,209,282 | Rodin | July 23, 1940 |
| 2,215,516 | Schooler | Sept. 24, 1940 |
| 2,338,337 | Kerr | Jan. 4, 1944 |

FOREIGN PATENTS

| Number | Country | Date |
|---|---|---|
| 22,095 | Great Britain | 1901 |
| 543,411 | Great Britain | Feb. 24, 1942 |